(12) United States Patent
Kobayashi

(10) Patent No.: US 9,403,959 B2
(45) Date of Patent: Aug. 2, 2016

(54) ANTIOZONANT FOR POLYMERS

(71) Applicant: SUMITOMO RUBBER INDUSTRIES, LTD., Kobe-shi, Hyogo (JP)

(72) Inventor: Masatoshi Kobayashi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 35 days.

(21) Appl. No.: 14/096,699

(22) Filed: Dec. 4, 2013

(65) Prior Publication Data
US 2014/0179853 A1 Jun. 26, 2014

(30) Foreign Application Priority Data

Dec. 21, 2012 (JP) ................. 2012-279874

(51) Int. Cl.
| | | |
|---|---|---|
| *C08K 3/22* | (2006.01) | |
| *C08L 9/06* | (2006.01) | |
| *C08L 9/02* | (2006.01) | |
| *B60C 1/00* | (2006.01) | |
| *C08L 7/00* | (2006.01) | |
| *C08K 3/04* | (2006.01) | |
| *C08K 5/09* | (2006.01) | |
| *C08K 5/00* | (2006.01) | |
| *C08K 5/47* | (2006.01) | |

(52) U.S. Cl.
CPC ................. *C08K 3/22* (2013.01); *B60C 1/0016* (2013.04); *B60C 1/0025* (2013.04); *C08L 9/02* (2013.01); *C08L 9/06* (2013.01)

(58) Field of Classification Search
CPC .......... B60C 1/00; C08K 3/0041; C08K 3/22; C08K 3/04; C08K 5/09; C08K 5/005; C08K 5/47; C08K 2003/2227; C08L 9/06; C08L 21/00; C08L 9/00; C08L 25/10; C08L 7/00
USPC ....................................................... 524/430
See application file for complete search history.

(56) References Cited

U.S. PATENT DOCUMENTS

| | | | | |
|---|---|---|---|---|
| 2005/0098252 A1* | 5/2005 | Muraoka et al. | ............. | 152/510 |
| 2005/0247391 A1* | 11/2005 | Ikuta | ............. | 152/565 |
| 2006/0217473 A1* | 9/2006 | Hergenrother et al. | ....... | 524/261 |
| 2009/0272475 A1* | 11/2009 | Resmini et al. | ............. | 152/450 |
| 2010/0012248 A1* | 1/2010 | Meuret et al. | ................ | 152/526 |
| 2012/0157571 A1* | 6/2012 | Longchambon | ...... | B60C 1/0016 523/351 |

FOREIGN PATENT DOCUMENTS

JP 7-62156 A 3/1995

* cited by examiner

*Primary Examiner* — Angela C Scott
(74) *Attorney, Agent, or Firm* — Birch, Stewart, Kolasch & Birch, LLP

(57) ABSTRACT

Provided are an antiozonant for polymers capable of providing excellent ozone resistance, and an ozone resistant rubber composition and an ozone resistant tire formed using the antiozonant. The present invention relates to an antiozonant for polymers, including alumina.

13 Claims, No Drawings

ANTIOZONANT FOR POLYMERS

TECHNICAL FIELD

The present invention relates to an antiozonant for polymers, and an ozone resistant rubber composition and an ozone resistant tire formed using the same.

BACKGROUND ART

To polymers such as rubbers are generally added antioxidants or the like to impart properties such as ozone resistance (see Patent Literature 1). For example, the tread rubber of a tire incorporates a phenylenediamine antioxidant (6C) or a ketone/amine condensate antioxidant (RD) in order to prevent brown discoloration due to blended chemicals as much as possible while maintaining oxidation resistance, ozone resistance, flex crack growth resistance, and UV resistance. Further, the tread rubber also incorporates wax in order to suppress static crack growth.

Tires are known to deteriorate due to radicals generated in rubber when exposed to ozone, ultraviolet light, or oxygen. It is considered that if an antioxidant can rapidly trap such radicals and convert them into harmless ones, reactions of radicals to double bonds in rubber and breakage of polymer chains can be prevented, and generation and growth of cracks can therefore be suppressed. For this reason, conventionally, a large amount of antioxidant is added to suppress generation and growth of cracks particularly resulting from ozone deterioration.

However, although tread rubbers and sidewall rubbers of tires, which contain a phenylenediamine antioxidant, are excellent in ozone resistance and flex crack growth resistance, the phenylenediamine antioxidant can easily bloom to the tire surface, and the tires have poor heat stability such as being volatile and also have the problem of brown discoloration due to chemicals. On the other hand, if the amount of phenylenediamine antioxidant is reduced to avoid brown discoloration, then rubbers are remarkably deteriorated, which can easily cause breakage phenomena such as generation and growth of cracks and rubber chipping. Particularly, tires mounted on frequently driven vehicles have less problem of brown discoloration because a newly exposed tread rubber surface is formed due to tire wear. On the other hand, tires mounted on less frequently driven vehicles and tread groove bottoms on which no wear is caused can turn brown to cause a problem in appearance.

Moreover, on sidewalls, the same rubber surface is always exposed, and the history of deterioration including brown discoloration is accumulated on the surface. Thus, such brown discoloration is noticeable in appearance when the tires are mounted. Therefore, sidewalls more often have the problem of brown discoloration than treads. When sidewalls turn brown, users may post-apply commercial glossing wax or the like to the tires. Some kinds of wax may promote transfer of an antioxidant to the rubber surface and volatilization of the antioxidant to impair ozone resistance and thereby promote cracking of sidewalls. As described above, the measures using only known antioxidants have problems in suppressing deterioration of rubber compositions due to ozone and the like.

CITATION LIST

Patent Literature

Patent Literature 1: JP-A H07-62156

SUMMARY OF INVENTION

Technical Problem

The present invention aims to solve the above problems and provide an antiozonant for polymers capable of providing excellent ozone resistance, and an ozone resistant rubber composition and an ozone resistant tire formed using the antiozonant.

Solution to Problem

The present invention relates to an antiozonant for polymers, comprising alumina.

Here, the polymers may suitably be rubbers, that is, the antiozonant for polymers can be suitably used as an antiozonant for rubbers.

The present invention relates to an ozone resistant rubber composition, comprising: a rubber component; and the antiozonant for polymers in an amount of 0.5 to 20 parts by mass per 100 parts by mass of the rubber component.

Here, the ozone resistant rubber composition preferably further comprises zinc oxide.

The ozone resistant rubber composition is preferably for use as an ozone resistant rubber composition for treads, wherein an amount of styrene-butadiene rubber is 50 to 100% by mass based on 100% by mass of the rubber component.

The ozone resistant rubber composition is preferably for use as an ozone resistant rubber composition for sidewalls, wherein an amount of butadiene rubber is 40 to 100% by mass based on 100% by mass of the rubber component.

The present invention also relates to an ozone resistant tire, formed from the ozone resistant rubber composition.

Advantageous Effects of Invention

The present invention relates to an antiozonant for polymers, including alumina. Therefore, the incorporation of such an antiozonant into polymer products such as rubbers can provide excellent ozone resistance to these products.

DESCRIPTION OF EMBODIMENTS

The antiozonant for polymers of the present invention includes alumina. The present invention is based on the finding that alumina effectively functions as an antiozonant for polymers such as rubbers. Like some inorganic oxides and metal oxides, alumina functions to decompose ozone on its surface into oxygen. This is called catalytic decomposition of ozone, and this reaction generally occurs at temperatures lower than that of thermal decomposition. Therefore, the incorporation of alumina into, for example, a tread rubber including styrene-butadiene rubber and the like or a sidewall rubber including butadiene rubber and the like can suppress generation and growth of cracks and rubber chipping resulting from ozone deterioration.

Further, since ozone resistance can be effectively improved, generation and growth of cracks due to ozone deterioration can be sufficiently suppressed without particularly increasing the amount of antioxidant such as phenylenediamine antioxidant (6C). Therefore, sufficient ozone resistance can be achieved and, at the same time, the problem of brown discoloration can be prevented. Further, the rubber properties can be maintained at the same levels as those of conventional rubber compositions, and tread rubbers and sidewall rubbers with good properties can therefore be provided.

Examples of the alumina included in the antiozonant for polymers include α-alumina, and activated alumina such as γ-alumina, ρ-alumina, χ-alumina, η-alumina, δ-alumina, κ-alumina, θ-alumina, and amorphous alumina. Among these, activated alumina is preferred and γ-alumina is particularly preferred, in terms of resistance to ozone deterioration. The activated alumina may be a porous filler represented by the rational formula: $Al_2O_3 \cdot xH_2O$ (where x is 0 to 3). Commercial products of aluminum oxide may be used as the alumina, and aluminum oxide with a relatively large specific surface area, which is commercially available as activated alumina, may be used.

The alumina is preferably in the form of particles having an average particle size of 3 nm to 500 μm, more preferably 5 nm to 300 μm, in terms of resistance to ozone deterioration. The average particle size of alumina can be determined by a method commonly used for the measurement of the particle size of oxide particles, for example, by laser diffraction. The average particle size refers to D50% of a cumulative mass particle size distribution. When the particles have an average particle size of less than 50 nm, they are directly observed using a transmission electron microscope or a scanning electron microscope to measure the circle equivalent diameter which is defined as the number average particle size.

The alumina preferably has a nitrogen adsorption specific surface area ($N_2SA$) of 80 to 600 $m^2/g$, more preferably 100 to 400 $m^2/g$, in terms of resistance to ozone deterioration.

The $N_2SA$ of alumina can be measured according to JIS K 6217-2:2001.

The ozone resistant rubber composition of the present invention includes a rubber component and the antiozonant for polymers including alumina.

Examples of rubber materials usable as the rubber component include diene rubbers such as natural rubber (NR) and synthetic diene rubbers. Examples of the synthetic diene rubbers include isoprene rubber (IR), butadiene rubber (BR), styrene-butadiene rubber (SBR), styrene-isoprene-butadiene rubber (SIBR), chloroprene rubber (CR), acrylonitrile-butadiene rubber (NBR), and butyl rubber (IIR).

In cases where the ozone resistant rubber composition of the present invention is used as an ozone resistant rubber composition for tread rubbers, a rubber component including styrene-butadiene rubber (SBR) is preferably used. The SBR to be used is not particularly limited and may be one commonly used in the tire industry.

In the ozone resistant rubber composition for treads, the amount of SBR is preferably 50 to 100% by mass, and more preferably 60 to 80% by mass, based on 100% by mass of the rubber component. If the amount is less than 50% by mass, the wet grip performance tends to be reduced.

In terms of breaking energy, the ozone resistant rubber composition for treads preferably further includes natural rubber (NR). The NR to be used is not particularly limited and may be one commonly used in the tire industry. Specific examples of the NR include RSS#3 and TSR20. In the ozone resistant rubber composition for treads, the amount of NR is preferably 0 to 50% by mass, and more preferably 20 to 40% by mass, based on 100% by mass of the rubber component.

In cases where the ozone resistant rubber composition of the present invention is used as an ozone resistant rubber composition for sidewalls, a rubber component including butadiene rubber (BR) is preferably used. The BR may be one commonly used in the tire industry. Specific examples of the BR include BR150B produced by UBE INDUSTRIES, LTD.

In the ozone resistant rubber composition for sidewalls, the amount of BR is preferably 40 to 100% by mass, and more preferably 50 to 70% by mass, based on 100% by mass of the rubber component. If the amount is less than 40% by mass, the ozone resistance tends to be reduced.

The ozone resistant rubber composition for sidewalls preferably further includes natural rubber (NR). In this case, the amount of NR is preferably 0 to 60% by mass, and more preferably 30 to 50% by mass, based on 100% by mass of the rubber component. The ozone resistance of NR is remarkably lower than that of BR or SBR. Therefore, a polymer component containing a small amount of BR and a large amount of NR has low ozone resistance. The composition including such a polymer component is less likely to have desired ozone resistance even when alumina is added.

In the ozone resistant rubber composition of the present invention, the amount of alumina (antiozonant for polymers) to be added per 100 parts by mass of the rubber component is preferably 0.5 parts by mass or more, and more preferably 1.0 part by mass or more. If the amount is less than 0.5 parts by mass, the effect of preventing ozone deterioration may not be exhibited. The amount of alumina is preferably 20 parts by mass or less, and more preferably 15 parts by mass or less. If the amount is more than 20 parts by mass, the problem of reduction of tensile parameters such as elongation at break (EB) and tensile strength at break (TB) may occur.

The ozone resistant rubber composition preferably includes an antioxidant. Examples of the antioxidant include, but are not limited to, amine derivatives such as diphenylamine antioxidants, p-phenylenediamine antioxidants, and naphthylamine antioxidants; quinoline derivatives; hydroquinone derivatives; phenols (monophenols, bisphenols, trisphenols, hindered phenols, polyphenols, thiobisphenols); benzimidazoles; thioureas; phosphites; and organic thioates.

Examples of the diphenylamine antioxidants include p-isopropoxydiphenylamine, p-(p-toluenesulfonyl amide)diphenylamine, N,N-diphenylethylenediamine, and octylated diphenylamine.

Examples of the p-phenylenediamine antioxidants include: N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenyl-hexyl-p-phenylenediamine, and phenyl-octyl-p-phenylenediamine.

Examples of the naphthylamine antioxidants include phenyl-α-naphthylamine, phenyl-β-naphthylamine, and aldol-α-trimethyl 1,2-naphthylamine.

Examples of the quinoline antioxidants (quinoline derivatives) include 2,2,4-trimethyl-1,2-dihydroquinoline polymer and 6-ethoxy-2,2,4-trimethyl-1,2-dihydroquinoline.

Examples of the hydroquinone antioxidants (hydroquinone derivatives) include 2,5-di-(tert-amyl)hydroquinone and 2,5-di-tert-butylhydroquinone.

As for the phenol antioxidants (phenols), examples of the monophenol antioxidants include 2,6-di-tert-butyl-4-methylphenol, 2,6-di-tert-butyl-4-ethylphenol, 2,6-di-tert-butylphenol, 1-oxy-3-methyl-4-isopropylbenzene, butylated hydroxyanisole, 2,4-dimethyl-6-tert-butylphenol, n-octadecyl-3-(4'-hydroxy-3',5'-di-tert-butylphenyl)propionate, and styrenated phenol. Examples of the bisphenol, trisphenol, and polyphenol antioxidants include 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 1,1'-bis(4-hydroxyphenyl)-cyclohexane, and tetrakis

[methylene-3-(3',5'-di-tert-butyl-4'-hydroxyphenyl) propionate]methane. Examples of the thiobisphenol antioxidants include 4,4'-thiobis-(6-tert-butyl-3-methylphenol), and 2,2'-thiobis-(6-tert-butyl-4-methylphenol).

Examples of the benzimidazole antioxidants (benzimidazoles) include 2-mercaptomethyl benzimidazole. Examples of the thiourea antioxidants (thioureas) include tributylthiourea. Examples of the phosphite antioxidants (phosphites) include tris(nonylphenyl)phosphite. Examples of the organic thioate antioxidants (organic thioates) include dilauryl thiodipropionate.

Among these, in terms of remarkably improving ozone resistance, p-phenylenediamine antioxidants are preferred, and N-(1,3-dimethylbutyl)-N'-phenyl-p-phenylenediamine is more preferred.

In the ozone resistant rubber composition of the present invention, the amount of the antioxidant to be added per 100 parts by mass of the rubber component is preferably 0.2 parts by mass or more, and more preferably 1 part by mass or more. If the amount is less than 0.2 parts by mass, no effect tends to be obtained by the addition of the antioxidant. Also, the amount of the antioxidant is preferably 6 parts by mass or less, and more preferably 4 parts by mass or less. An amount of more than 6 parts by mass is more than that required for ozone resistance, and may also cause the problem of brown discoloration.

In the ozone resistant rubber composition of the present invention, the total combined amount of the alumina (antiozonant for polymers) and the antioxidant to be added per 100 parts by mass of the rubber component is preferably 1.5 parts by mass or more, and more preferably 2.2 parts by mass or more. If the total combined amount is less than 1.5 parts by mass, the effect of preventing ozone deterioration may not be obtained sufficiently. Also, the total combined amount is preferably 25 parts by mass or less, and more preferably 23 parts by mass or less. If the total combined amount is more than 25 parts by mass, the tensile parameters may be reduced and brown discoloration may be caused.

The ozone resistant rubber composition preferably includes wax leading to an improvement in ozone resistance.

Examples of the wax include petroleum wax such as paraffin wax, and vegetable wax such as carnauba wax, rice wax, candelilla wax, japan wax, urushi wax, sugar cane wax, and palm wax. Among these, petroleum wax is preferred and paraffin wax is more preferred, because they provide excellent ozone resistance.

The amount of wax to be added per 100 parts by mass of the rubber component is preferably 0.1 parts by mass or more, and more preferably 0.5 parts by mass or more. If the amount is less than 0.1 parts by mass, an effective film may not be formed therefrom. The amount is preferably 5 parts by mass or less, and more preferably 3 parts by mass or less. If the amount is more than 5 parts by mass, discoloration on the rubber surface may not be sufficiently suppressed.

The ozone resistant rubber composition preferably includes zinc oxide. Zinc oxide effectively functions as an accelerator for the ozone decomposition reaction of alumina. The zinc oxide is not particularly limited and may be one commonly used in the tire industry. Examples thereof include zinc oxides #1 to #3.

The amount of zinc oxide to be added per 100 parts by mass of the rubber component is preferably 1 part by mass or more, and more preferably 2 parts by mass or more. If the amount is less than 1 part by mass, then zinc oxide may not sufficiently function as the accelerator for the ozone decomposition. The amount is preferably 10 parts by mass or less, and more preferably 5 parts by mass or less. If the amount is more than 10 parts by mass, then zinc oxide is less likely to disperse and the breaking energy may be reduced.

The ozone resistant rubber composition of the present invention preferably includes carbon black leading to an improvement in rubber strength.

The amount of carbon black to be added per 100 parts by mass of the rubber component is preferably 10 parts by mass or more, and more preferably 30 parts by mass or more. If the amount is less than 10 parts by mass, the breaking energy and grip performance tend to be reduced. The amount of carbon black is preferably 100 parts by mass or less, and more preferably 70 parts by mass or less. If the amount is more than 100 parts by mass, the dispersibility tends to be reduced.

In addition to the above ingredients, the ozone resistant rubber composition of the present invention may appropriately contain a compounding agent commonly used in the preparation of a rubber composition, such as silica, a silane coupling agent, oil, stearic acid, a vulcanizing agent, and a vulcanization accelerator.

The ozone resistant rubber composition of the present invention which can be applied to treads, sidewalls and the like can be prepared by an ordinary method. Specifically, the rubber composition can be prepared, for example, by a method including kneading the aforementioned ingredients with a kneading apparatus such as a Banbury mixer, a kneader, or an open roll mill, and then vulcanizing the resultant mixture.

The ozone resistant tire of the present invention can be produced from the above ozone resistant rubber composition by an ordinary method. Specifically, an unvulcanized rubber composition containing various additives as necessary is extruded into the shape of a tread or sidewall, and then arranged in a tire building machine in a usual manner and assembled with other tire components to form an unvulcanized tire. Then, the unvulcanized tire is heated and pressurized in a vulcanizer, whereby the tire can be produced.

EXAMPLES

The present invention will be more specifically described with reference to examples, but the present invention is not limited only thereto.

The chemical agents used in examples and comparative examples are listed below.

NR: TSR20
BR: BR150B produced by UBE INDUSTRIES, LTD.
SBR: HPR355 produced by JSR
Carbon black: DIABLACK E (N550) ($N_2SA$: 41 $m^2/g$) produced by Mitsubishi Chemical Corp.
Aromatic oil: Process X-140 produced by Japan Energy Corporation
Zinc oxide: Zinc oxide produced by Mitsui Mining & Smelting Co., Ltd.
Stearic acid: Tsubaki produced by NOF Corporation
Antioxidant: Antigene 6C(N-(1,3-dimethylbutyl)-N'-phenyl-p-phenylenediamine) produced by Sumitomo Chemical Co., Ltd.
Alumina: Activated alumina (γ-alumina, average particle size: 75 μm (primary particle, by TEM), $N_2SA$: 220 $m^2/g$) produced by Wako Pure Chemical Industries, Ltd.
Wax: OZOACE 355 produced by Nippon Seiro Co., Ltd.
Insoluble sulfur: SEIMI sulfur (60% of matter insoluble in carbon disulfide and 10% of oil) produced by NIPPON KANRYU INDUSTRY CO., LTD.
Vulcanization accelerator TBBS: NOCCELER NS(N-tert-butyl-2-benzothiazolylsulfenamide) produced by OUCHI SHINKO CHEMICAL INDUSTRIAL CO., LTD.

<Examples and Comparative Examples>

A 1.7-L Banbury mixer (produced by KOBE STEEL, LTD.) was charged with the materials other than the sulfur and vulcanization accelerator in accordance with each of the compounding formulations shown in Tables 1 and 2, to give a filling rate of 58%. The materials were kneaded at 80 rpm until the temperature reached 140° C. Then, the sulfur and vulcanization accelerator were added to the resulting kneaded mixture to prepare an unvulcanized rubber composition. The unvulcanized rubber composition was vulcanized at 160° C. for 20 minutes, whereby a vulcanized rubber composition was prepared.

The obtained vulcanized rubber compositions (vulcanized rubber pieces, vulcanized rubber sheets) were evaluated as follows. Tables 1 and 2 show the results.

<Testing Methods>

(Ozone Resistance)

In accordance with JIS K 6259, each of the vulcanized rubber pieces (60 mm in length×10 mm in width×2.0 mm in thickness) was stretched to an elongation of 30%, and was then subjected to a static ozone deterioration test (ambient temperature: 40° C.) by allowing the test piece to stand at an ozone concentration of 50 pphm for 24 hours. Also, a dynamic ozone deterioration test was performed by stretching a test piece to an elongation of 0 to 20% with a reciprocating motion at an ozone concentration of 50 pphm and an ambient temperature of 40° C. for 24 hours in accordance with the aforementioned JIS standard. After each of the tests, the formation of cracks was visually observed to evaluate the ozone resistance based on the following criteria.

Excellent: No crack was generated.
Good: A fine crack was generated.
Fair: A crack is present.
Poor: A large crack is present.

(Tensile Test)

The tensile strength and elongation at break of each of the vulcanized rubber sheets were measured in accordance with JIS K 6251 "Rubber vulcanized or thermoplastic—Determination of tensile stress-strain properties". Further, the breaking energy was calculated by the formula:

[(tensile strength)×(elongation at break)]/2, and the breaking energy index was then calculated by the following formula.

(Breaking energy index)=(Breaking energy of each formulation)/(Breaking energy of Comparative Example 1 or 3)×100

(Wet Grip Performance)

The loss tangent (tan δ) of each of the vulcanized rubber compositions was determined using a viscoelasticity spectrometer VES (produced by Iwamoto Seisakusho Co., Ltd.) at a temperature of 0° C., an initial strain of 10%, and a dynamic strain of 0.5%. The loss tangent, tan δ, of each composition was expressed as an index relative to that of Comparative Example 1 (=100), based on the following formula. A larger index indicates better wet grip performance.

(Wet grip index)=(tan δ of each formulation)/(tan δ of Comparative Example 1)×100

(Degree of Black)

Each of the vulcanized rubber pieces was allowed to stand for 1 week at an ozone concentration of 50 pphm and a temperature of 40° C. Then, the degree of black of the rubber piece was measured using a color difference meter to evaluate the discoloration (white discoloration and brown discoloration) based on the following criteria.

5: Not discolored.
4: Slightly discolored.
3: The discolored area is less than half of the whole piece.
2: The discolored area is equal to or more than half of the whole piece.
1: Entirely discolored.

TABLE 1

Ozone resistant rubber composition for treads

| | Comparative Example | Example | | | | Comparative Example |
|---|---|---|---|---|---|---|
| | 1 | 1 | 2 | 3 | 4 | 2 |
| NR | 30 | 30 | 30 | 30 | 30 | 30 |
| SBR | 70 | 70 | 70 | 70 | 70 | 70 |
| Carbon black | 60 | 60 | 60 | 60 | 60 | 60 |
| Zinc oxide | 2.5 | 2.5 | 2.5 | 2.5 | 2.5 | 2.5 |
| Stearic acid | 2 | 2 | 2 | 2 | 2 | 2 |
| Antioxidant (6PPD) | 2 | 2 | 2 | 2 | 2 | 2 |
| Alumina (activated alumina) | — | 0.5 | 5 | 10 | 20 | 25 |
| Wax | 1.5 | 1.5 | 1.5 | 1.5 | 1.5 | 1.5 |
| Insoluble sulfur | 1.5 | 1.5 | 1.5 | 1.5 | 1.5 | 1.5 |
| Vulcanization accelerator TBBS | 1 | 1 | 1 | 1 | 1 | 1 |
| Ozone resistance | Fair | Good | Good | Excellent | Excellent | Excellent |
| Breaking energy index | 100 | 98.6 | 94.8 | 90.1 | 85.6 | 78.6 |
| Wet grip index | 100 | 100 | 101 | 103 | 102 | 104 |
| Degree of black | 5 | 5 | 5 | 5 | 5 | 5 |

TABLE 2

Ozone resistant rubber composition for sidewalls

| | Comparative Example | Example | | | | Comparative Example |
|---|---|---|---|---|---|---|
| | 3 | 5 | 6 | 7 | 8 | 4 |
| NR | 40 | 40 | 40 | 40 | 40 | 40 |
| BR | 60 | 60 | 60 | 60 | 60 | 60 |

TABLE 2-continued

Ozone resistant rubber composition for sidewalls

| | Comparative Example | Example | | | | Comparative Example |
|---|---|---|---|---|---|---|
| | 3 | 5 | 6 | 7 | 8 | 4 |
| Carbon black | 60 | 60 | 60 | 60 | 60 | 60 |
| Aromatic oil | 5 | 5 | 5 | 5 | 5 | 5 |
| Zinc oxide | 2.5 | 2.5 | 2.5 | 2.5 | 2.5 | 2.5 |
| Stearic acid | 2 | 2 | 2 | 2 | 2 | 2 |
| Antioxidant (6PPD) | 2.4 | 2.4 | 2.4 | 2.4 | 2.4 | 2.4 |
| Alumina (activated alumina) | — | 0.5 | 5 | 10 | 20 | 25 |
| Wax | 1.2 | 1.2 | 1.2 | 1.2 | 1.2 | 1.2 |
| Insoluble sulfur | 1.5 | 1.5 | 1.5 | 1.5 | 1.5 | 1.5 |
| Vulcanization accelerator TBBS | 1 | 1 | 1 | 1 | 1 | 1 |
| Ozone resistance | Fair | Good | Excellent | Excellent | Excellent | Excellent |
| Breaking energy index | 100 | 99 | 96.3 | 90.3 | 86.1 | 77.1 |
| Degree of black | 5 | 5 | 5 | 5 | 5 | 5 |

Among the tread rubbers in Table 1, the tread rubbers of Examples 1 to 4, which contained a predetermined amount of activated alumina, had improved ozone resistance and excellent wet grip performance while maintaining a breaking energy index of 85 or higher which practically causes no problem, when compared to the tread rubber of Comparative Example 1 which contained no activated alumina. The tread rubber of Comparative Example 2, which contained a large amount of activated alumina, had good ozone resistance but had poor breaking energy. The breaking energy and ozone resistance of the sidewalls in Table 2 also showed similar tendencies. Further, discoloration (white discoloration, brown discoloration) on the rubber surface was sufficiently suppressed in the tread rubbers and sidewall rubbers of the examples in Tables 1 and 2.

The invention claimed is:

1. An ozone resistant rubber composition, comprising:
   a rubber component; and
   an antiozonant for polymers comprising γ-alumina having an average particle size of 5 nm to 300 μm,
   wherein an amount of the antiozonant for polymers is 0.5 to 20 parts by mass per 100 parts by mass of the rubber component.

2. The ozone resistant rubber composition according to claim 1, further comprising zinc oxide.

3. The ozone resistant rubber composition according to claim 1,
   wherein said rubber component comprises styrene-butadiene rubber, and an amount of said styrene-butadiene rubber is 50 to 100% by mass based on 100% by mass of the rubber component.

4. The ozone resistant rubber composition according to claim 1,
   wherein said rubber component comprises butadiene rubber, and an amount of said butadiene rubber is 40 to 100% by mass based on 100% by mass of the rubber component.

5. An ozone resistant tire, formed from the ozone resistant rubber composition according to claim 1.

6. The ozone resistant tire according to claim 5, wherein said rubber composition further comprises zinc oxide.

7. The ozone resistant tire according to claim 5 having a tread formed from said rubber composition, wherein the rubber component of said rubber composition comprises styrene-butadiene rubber, and an amount of said styrene-butadiene rubber is 50 to 100% by mass based on 100% by mass of the rubber component.

8. The ozone resistant tire according to claim 5 having a sidewall formed from said rubber composition, wherein the rubber component of said rubber composition comprises butadiene rubber, and an amount of said butadiene rubber is 40 to 100% by mass based on 100% by mass of the rubber component.

9. The ozone resistant tire according to claim 5, wherein the γ-alumina in said rubber composition has a nitrogen adsorption specific surface area of 80 to 600 $m^2/g$.

10. The ozone resistant tire according to claim 5, wherein the amount of the antiozonant for polymers in said rubber composition is 0.5 to 15 parts by mass per 100 parts by mass of the rubber component.

11. The ozone resistant rubber composition according to claim 1, wherein the γ-alumina has a nitrogen adsorption specific surface area of 80 to 600 $m^2/g$.

12. The ozone resistant rubber composition according to claim 1, wherein the amount of the antiozonant for polymers is 0.5 to 15 parts by mass per 100 parts by mass of the rubber component.

13. The ozone resistant rubber composition according to claim 1, wherein the polymers are rubbers.

* * * * *